Figure 2:
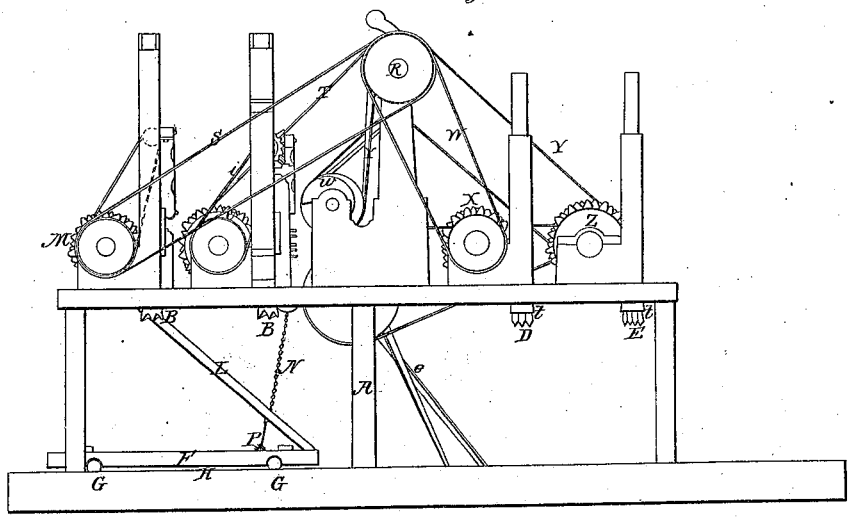

Poland & Blossom,
Dressing Stone.
N° 458.  Patented Nov. 11, 1837.
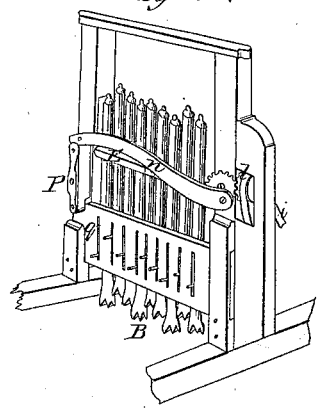
Fig. 10.
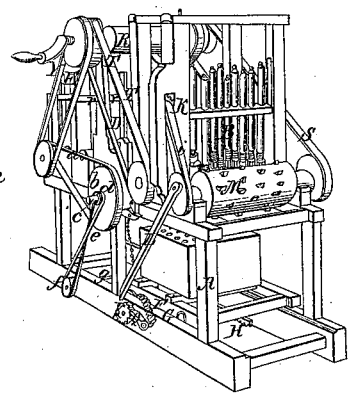
Fig. 1.
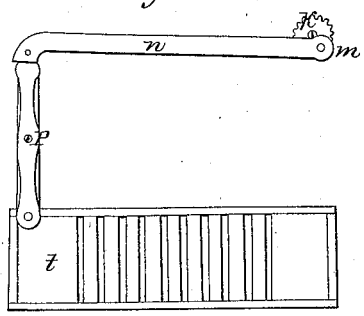
Fig. 4.
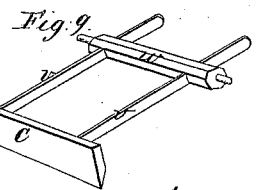
Fig. 9.
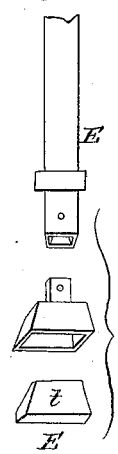
Fig. 11.
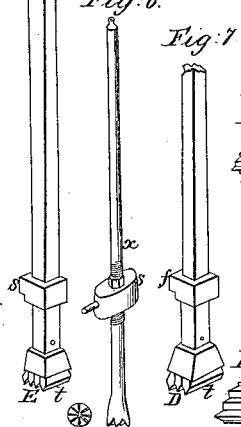
Fig. 5. Fig. 6. Fig. 7.
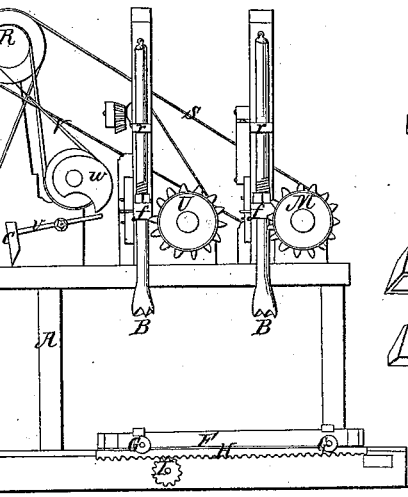
Fig. 8.

2 Sheets, Sheet 2.

*Poland & Blossom,*

*Dressing Stone.*

Nº 458.    Patented Nov. 11, 1837.

AM. PHOTO-LITHO. CO. N.Y. (OSBORNE'S PROCESS.)

UNITED STATES PATENT OFFICE.

WILLIAM C. POLAND AND EARL BLOSSOM, OF PORTLAND, MAINE.

MACHINE FOR CUTTING AND DRESSING GRANITE AND OTHER STONE.

Specification of Letters Patent No. 458, dated November 11, 1837.

*To all whom it may concern:*

Be it known that we, WILLIAM C. POLAND and EARL BLOSSOM, both of the city of Portland, county of Cumberland, and State of Maine, have invented a new and useful Machine for Dressing Granite and other Stone, which is described as follows, reference being had to the annexed drawings of the same, making part of this specification.

The frame is oblong of a length, breadth and height suited to the parts of the machinery described below, which are to be placed therein.

The machine consists essentially of four parts: viz First: a gang or set, or sets of drills to aid in reducing the face of the stone to an even surface: second: a set for breaking off the pieces left between the holes made by the drills: Third: a gang of cutters to do the work usually done by chisels: fourth: a gang of finishers:

The drills, cutters and finishers fall vertically upon the block of stone, which is passed under them, by means of a carriage upon which the stone is placed, moving longitudinally on small rollers propelled by means of cog-wheels and rack; the movement being subject to the check and control of the persons superintending its operation.

The drills are made cylindrical and set in a frame work at right-angles to the line of motion of the block of stone, and perpendicular to its face, as it passes under them. They are raised to a height sufficient to operate effectually by their gravity for the purpose of drilling to any required depth in the stone: The drills are raised by means of cogs set in the surface of a cylinder moving on a horizontal axis, and are regulated by a screw passing through a gage and secured by a nut, thereby providing for the equal wear of the drills which are adjusted at pleasure. One of the drills see H Fig. 6 of the annexed drawings which is situated in the second gang, on the side, will be found so contrived; the others are not, although in practice all are intended to be so. The cogs are placed obliquely or spirally on the surface of the cylinder, so as to raise the drills (when set in motion) alternately in succession, by striking shoulders or projections in the shafts of the drills; and as the cogs leave them, on the revolutions of the cylinder, they fall by their grivity upon the block of stone.

The drills are terminated with steel, divided or pointed at the end striking the stone with projecting points or marks in the form of a cross, during the time of raising the drills, they are partially turned round on the line of their axes by a grooved slide, or register, running horizontally across the machine and so connected with the drills as to give them a vibrating rotary motion, by a rotary motion of certain bevel wheels and cranks, so fas as may be required for effectually drilling the holes (which is done in a row, or line directly across the block of stone) until they are of a uniform depth required to make a regular surface.

When these holes are drilled of a sufficient depth, the next process is cutting off the cores or projecting points, remaining between the holes after the drills have done their work. This is accomplished by an instrument called a set, somewhat resembling in shape a cooper's adze, edged or pointed with steel, raised in a circular arc by a cam on one of the axles hereinafter described. The set, after being raised to a proper height, falls and strikes the points or cores in the manner of the adze, so as to break them completely off, and prepare the block for the next process, which is analogous to that of hammering. For this purpose, the carriage on which the block of stone is placed, is moved by the racks and pinions, which cause it to pass toward the other end of the frame, where a gang of cutters are placed vertically in a row across the frame raised by means of cogs fixed in another cylinder similar to that by which the drills are worked. These cutters are square bars of iron faced with steel, and so pointed as, together with their weight in falling, after being raised as before described, to give the stone a proper hammered surface; and they are so set in the frame or box which they occupy, as to operate the shortest row first and the longest row last and thereby receive an equal division of labor to the different rows Figs. 5, 12. After passing under these cutters, the stone is moved further onward to the finishers.

The finishers are a set or gang of square iron bars with steel points arranged like the drills and cutters to move vertically, and raised by means of a cylinder with cogs inserted in like manner. These finishers are set beveling in a box or frame, so as to present a rhomboidal cutting surface, and so that each finisher cuts by or passes a little beyond the finisher next before it, thereby retouching a portion already passed over by the next preceding finisher in the next box or frame. The number of finishers to a box is unlimited and the cutting surfaces of these finishers are set beveling to the horizon, so that each in following the finisher which immediately precedes it may be more certain of its doing its part of the work, the first row of finishers, like the first row of cutters, being the shortest and the last row being the longest, and the slope or bevel from the former to the latter being uniform. See Figs. 7 and 13.

The drills, as well as the cutters and finishers, have steel terminations and points, so connected or fastened to the stem or shaft as to be easily taken off for repairing, sharpening or other adjustment, so as to keep them in exact order for operating on the stone; thus greatly reducing the expense of repairing. The number of drills, cutters and finishers may be regulated by the extent of the machine and the power used in operating; and within said extent a greater or less number of drills, &c., may be employed, according to the pleasure of the operator, or the extent of the surface of the stone to be worked.

Figure 3:
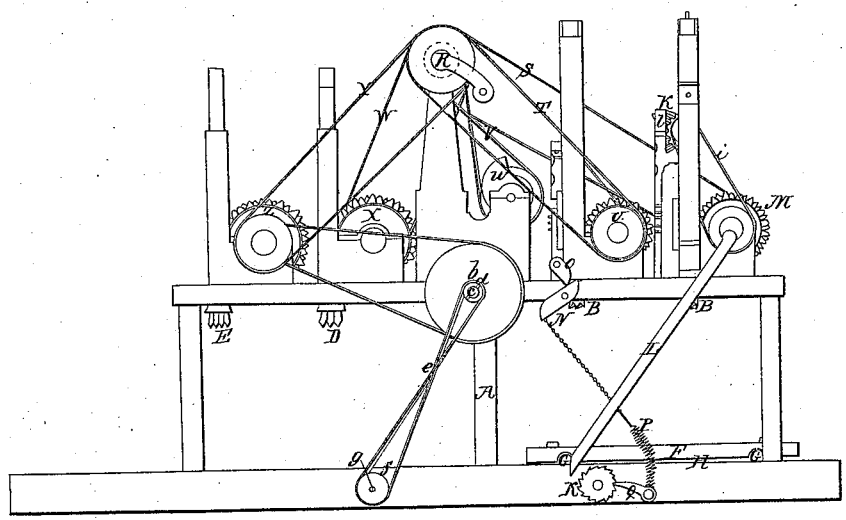

The drawings, Figures 2, 3, and 8 represent two sets marked B, B, both constructed alike. Additional gangs or lots of drills, &c., may also be added if required.

There may be four carriages in a line; one for each operation, and all operated at the same time, passing successively under the drills, set, cutters and finishers at the same time, so that each operation will be continued. Near the middle of the machine and at the upper part of the frame, the main shaft is placed in a horizontal position across the frame. To this shaft is applied steam, water, or whatever power is intended to be used, to set all its parts in motion, and this shaft is connected with the different parts of the machine, where power or motion is required, by means of bands, drums or cylinders, and with such apparatus as is usually employed in manufacturing machinery.

A, in the drawing represents the frame, See Figures 1, 2, 3, 8.

B, B, two sets of drills for drilling the holes in the stone; both constructed and operated in like manner. See Figs. 1, 2, 3, 8.

C, the set or chisel for breaking or cutting off the cores or pieces left between the holes made by the drills extending across the face of the stone and operated in the manner of an adze. See Figs. 8 and 9.

D, the cutters before described. Figs. 1, 2, 3, 8, 7, 11, 13.

E, the finishers. Figs. 1, 2, 3, 5, 8, 12, 11.

F, the carriage. Figs. 1, 2, 3, 8.

G, rollers on which the carriage moves on ways. Figs. 1, 2, 3, 8.

H, rack fastened longitudinally on the bottom of the carriage. Figs. 1 and 8.

I, pinion on an axle lying across the frame below the carriage—the pinion working into the rack. Fig. 8.

K, a ratchet-wheel on the end of the pinion axle. Figs. 1 and 3.

L, an arm—one end working in the teeth of the ratchet wheel, the other end being attached to the wrist of a crank on the end of the cylinder M. Figs. 1, 2, 3.

N, lever and chain for raising the end of the arm from the ratchet wheel. Figs. 1, 2, 3.

O, a catch or stop for holding up the arm. Figs. 1 and 3.

P, a spiral spring for drawing down the arm. Figs. 1, 2, 3.

Q, pawl. Figs. 1, 3.

R, driving shaft and pulleys. Figs. 1, 2, 3.

S, a band leading from the driving shaft to a pulley on the end of the axle of cylinder M, for turning it and for raising the drills. Figs. 1, 2, 3, 8.

T, band leading from the driving shaft to a pulley on the axle of cylinder U, for raising another set of drills. Figs. 1, 2, 3.

V, a band leading from the driving shaft to an axle on which are cams for raising the set C, in the manner of a trip-hammer. Figs. 2, 3, 8.

W, a band leading from the main shaft to a pulley on the end of the axle of the cylinder X. Figs. 2, 3, 8.

X, cylinder for raising the cutter D. Figs. 2, 3, 8.

Y, a band leading from the driving shaft to a pulley on the end of the cylinder Z, for raising the finishers E.

a Figs. 1 and 3. A band leading from cylinder Z, to a large pulley.

b, turning on a stud or pin c, inserted horizontally into the side of one of the posts of the frame. Figs. 1 and 3.

d, a small pulley fastened on the face of the large pulley b, and turning with it. Figs. 1 and 3.

e, Figs. 1, 2, 3. A band leading from the small pulley d, to a pulley f, on the end of the axle g, on which is a pinion h, Fig. 8, working into the rack fo the carriage for moving it forward with the stone under the cutters and finishers.

i, Fig. 3. A band leading from a pulley on the end of the cylinder M, to a small pulley on an axle carrying a bevel wheel K, working into another bevel-wheel l, on which is a crank m, Fig. 4, to which is attached a rod n, leading to and connected with, the end of a lever o, moving on a fulcrum or pin p, inserted in one of the posts of the frame, the other end of the said lever being attached to the vibrating slide or register q, for turning the drills horizontally, first to the right, and then to the left, as the slide moves backward and forwardly the motion of the crank, rod and lever. See also perspective view, Fig. 10.

The slide or register is a rectangular piece moving horizontally in grooves across the frame and containing as many vertical spaces as there are drills, into each of which spaces is placed a pin projecting from the drill, at right angles with the same, and by which the drill is turned, as the slide moves either way. A similarly constructed slide or register is applied to every set of drills used. See Fig. 10.

$r$, transverse guides in which the drills, cutters and finishers move up and down. See Figs. 1, 8, 10.

$s$, projections or shoulders on the drills, cutters and finishers, by which they are raised by the cams inserted in spiral lines in the surface of the cylinder. See Figs. 5, 6, 7, 8.

$t$, steel points of the drills, cutters, and finishers which are let into sockets in the ends of the shafts of the drills, cutters, and finishers, in such a manner that they can be taken out and replaced whenever required, to be sharpened or adjusted. See Figs. 5, 7, 11.

$u$, axle of the set or chisel. Figs. 8 and 9.

$v$, arms or levers of the set, through which the axle $u$ passes. See Figs. 8 and 9.

$w$, cams for raising the set. See Figs. 2, 3, and 8.

From the foregoing, it will be seen that the main feature of this machine consists in the method of dressing the stone, by first securing it on a carriage and bringing it under a set of drills; then applying the power (which may be steam, water, horse, or other power) to the main driving-shaft on which are a number of pulleys of different sizes, from one of which a band leads to a pulley on the end of the cylinder surrounded with spirally set cogs, which, as the cylinder revolves, take under shoulders or projections on the shafts of the drills, and raise them in succession, which, as the cogs leave said shoulders again fall in the same order and thus cut the stone by their gravity; the end of the drills being made of steel in the form of a cross and sharp, having also a horizontal vibrating rotary motion produced by a vibrating slide moved by the before described arrangement, of pulleys, bands, bevel-wheels, cranks, connecting rod and levers; said slide having ablong apertures in which are inserted pins projecting from the shafts of the drills.

When the holes are drilled to the required depth, the attendant places the end of the arm extending from the crank on the end of the cylinder, into the notches of the ratchet wheel, which thus causes it to turn, and having on its axle a pinion working into the rack of the carriage, advances the stone a little more than the diameter of the drill, when it is stopped by again raising the arm from the ratchet wheel; another row of holes are then drilled in the same manner, and so on, until the whole surface of the stone is drilled of a uniform depth; the arm is again put into gear with the ratchet wheel, and the stone carried forward to the set, which is made to operate in the manner of a triphammer, by cams on an axle bearing down the short ends of the handles of the set; at the same time raising the long ends on which the set is fastened; the axle of the cams continuing to revolve by the pulley and band leading to the driving-shaft; the cams leave the ends of the handles and the set falls in a circular arc, like a cooper's adze, cutting or breaking off the cores or pieces left between the holes; the carriage continues to advance till the stone is brought under the cutters, where it undergoes the next process, which is similar to that of hammering; the end of the cutters being faced with steel and so pointed as together with their weight in falling, after being raised in the manner of the drills, to give the stone a proper hammered surface. After passing under these cutters, the stone is moved further onwardly another pinion taking into the rack, geared by bands and pulleys to the driving shaft having a slow, regular, progressive movement, where it is made to pass under the finishers, which are a gang or set of square iron bars with steel points, operated and managed like the drills, except that they have not the horizontal vibratory movement and are set obliquely in a box or frame so that each passes over a part of the stone already passed over by one of the finishers in the next box or frame as hereinbefore described. The stone being finished passes off at the end of the frame.

The register or slide $q$ Fig. 4 for vibrating the drills, is moved by means of the band $i$ Fig. 3, passing around a pulley on the axle of one of the bevel wheels $k$, which works into the other bevel wheel $l$, on which there is a crank $m$, Fig. 4, to which the connecting rod $n$, is attached, and this to one end of the lever $o$, moving on a pin $p$, the other end being attached to the register or slide for vibrating the same with the drills; see Fig. 10.

When the second set of drills, represented in the drawings are used, the carriage must be made to advance with the stone in such a manner, that the first set shall cut the several rows of holes at such distances apart, as to leave room for the operation of the second set which will cut between them.

The same letters of reference refer alike to the same parts in the several figures of the drawing.

The invention claimed and desired to be secured by Letters Patent, consists—

1. In the combination and arrangement of the drills, set, cutters and finishers, in the manner before described.

2. The form of the set extending quite across the face of the stone to be dressed, in combination with the other parts of the machine.

3. The method of vibrating the drills in the manner before described.

WM. C. POLAND.
EARL BLOSSOM.

Witnesses:
JOHN NEAL,
R. SOUTHGATE BOYD.